United States Patent
Nigam et al.

(10) Patent No.: US 10,856,224 B2
(45) Date of Patent: Dec. 1, 2020

(54) METHOD AND SYSTEM FOR ENABLING DISCONTINUOUS RECEPTION (DRX) OVER AN UNLICENSED BAND IN CELLULAR NETWORKS

(71) Applicant: Samsung Electronics Co., Ltd., Gyeonggi-do (KR)

(72) Inventors: Anshuman Nigam, Bangalore (IN); Anil Agiwal, Bangalore (IN); Ashok Kumar Reddy Chavva, Bangalore (IN); Nagacharan Udupi, Bangalore (IN); Jung-Soo Jung, Seongnam-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 241 days.

(21) Appl. No.: 15/524,978

(22) PCT Filed: Nov. 6, 2015

(86) PCT No.: PCT/KR2015/011896
§ 371 (c)(1),
(2) Date: May 5, 2017

(87) PCT Pub. No.: WO2016/072787
PCT Pub. Date: May 12, 2016

(65) Prior Publication Data
US 2017/0339641 A1 Nov. 23, 2017

(30) Foreign Application Priority Data

Nov. 6, 2014 (IN) .......................... 5594/CHE/2014
Oct. 28, 2015 (IN) .......................... 5594/CHE/2014

(51) Int. Cl.
*H04W 52/02* (2009.01)
*H04W 76/28* (2018.01)
(Continued)

(52) U.S. Cl.
CPC ....... *H04W 52/0229* (2013.01); *H04L 5/0096* (2013.01); *H04W 16/14* (2013.01);
(Continued)

(58) Field of Classification Search
CPC ...... H04L 5/001; H04L 5/0096; H04W 16/14; H04W 52/0216; H04W 52/0229;
(Continued)

(56) References Cited

U.S. PATENT DOCUMENTS 9,998,971 B2 * 6/2018 Koc .................. H04W 52/0235
10,057,879 B2 * 8/2018 Hu ....................... H04W 68/005
(Continued)

FOREIGN PATENT DOCUMENTS

| WO | 2012/116489 A1 | 9/2012 |
| WO | 2013/035984 A1 | 3/2013 |
| WO | 2014/172306 A2 | 10/2014 |

OTHER PUBLICATIONS

"DRX Configuration Forwarding for Dual Connectivity," 3GPP TSG RAN WG2 Meeting #87bis, R2-144368, CATT, Shanghai, China, Oct. 6-10, 2014, 5 pages.
(Continued)

*Primary Examiner* — Asad M Nawaz
*Assistant Examiner* — Kai Chang

(57) ABSTRACT

The present disclosure relates to a pre-5th-Generation (5G) or 5G communication system to be provided for supporting higher data rates beyond 4th-Generation (4G) communication system such as a Long Term Evolution (LTE).
The present disclosure provides a method and system for enabling discontinuous reception (DRX) over an unlicensed band in cellular networks. In one embodiment, the method comprises of monitoring, by a user equipment (UE), an unlicensed channel at a pre-configured on period of a DRX cycle, wherein the UE wakes up during a DRX on period and
(Continued)

sleeps during DRX off period, receiving an indication of extension of the DRX on period from an associated evolved node B (eNB) when the associated eNB is unable to acquire an unlicensed channel during a DRX on period of the licensed channel and continuously monitoring the unlicensed band for the extended DRX on period. The time period for extension of the DRX on period of the unlicensed channel is selected from a set of pre-specified extension values. The present disclosure further enables the UE to terminate monitoring of the DRX on period of the unlicensed channel upon receiving a stop monitoring indication from the associated eNB.

12 Claims, 14 Drawing Sheets

(51) Int. Cl.
  *H04W 72/12* (2009.01)
  *H04L 5/00* (2006.01)
  *H04W 16/14* (2009.01)
  *H04W 88/02* (2009.01)
  *H04W 88/08* (2009.01)
(52) U.S. Cl.
  CPC ... *H04W 52/0216* (2013.01); *H04W 72/1289* (2013.01); *H04W 76/28* (2018.02); *H04L 5/001* (2013.01); *H04W 88/02* (2013.01); *H04W 88/08* (2013.01); *Y02D 30/70* (2020.08)
(58) Field of Classification Search
  CPC . H04W 72/1289; H04W 76/28; H04W 88/02; H04W 88/08; Y02D 70/00; Y02D 70/1244; Y02D 70/1246; Y02D 70/1262; Y02D 70/1264; Y02D 70/142; Y02D 70/164; Y02D 70/168; Y02D 70/21; Y02D 70/24; Y02D 70/26; Y02D 30/70
  See application file for complete search history.

(56) References Cited

U.S. PATENT DOCUMENTS

| | | | |
|---|---|---|---|
| 2009/0310503 A1* | 12/2009 | Tenny | H04W 68/00 370/252 |
| 2010/0091693 A1* | 4/2010 | Pelletier | H04W 52/0216 370/311 |
| 2012/0164948 A1* | 6/2012 | Narasimha | H04W 72/1215 455/63.1 |
| 2013/0114586 A1* | 5/2013 | Kim | H04L 5/0091 370/338 |
| 2014/0029459 A1* | 1/2014 | Kwon | H04W 76/28 370/252 |
| 2015/0063151 A1* | 3/2015 | Sadek | H04W 24/08 370/252 |
| 2015/0098381 A1* | 4/2015 | Cucala Garc A | H04W 52/02 370/311 |
| 2015/0131504 A1* | 5/2015 | Lin | H04W 52/0225 370/311 |
| 2015/0189574 A1* | 7/2015 | Ng | H04W 24/08 370/252 |
| 2015/0296560 A1* | 10/2015 | Sadek | H04W 72/1215 370/336 |
| 2015/0334643 A1* | 11/2015 | Maaref | H04W 48/18 370/329 |
| 2016/0014695 A1* | 1/2016 | Ehsan | H04L 5/14 370/311 |
| 2016/0044578 A1* | 2/2016 | Vajapeyam | H04W 52/0216 370/252 |
| 2016/0044605 A1* | 2/2016 | Vajapeyam | H04W 52/322 370/311 |
| 2016/0044740 A1* | 2/2016 | Siomina | H04W 76/14 455/552.1 |
| 2016/0095048 A1* | 3/2016 | Nory | H04W 24/08 370/252 |
| 2016/0095101 A1* | 3/2016 | Ye | H04L 1/1812 |
| 2016/0192292 A1* | 6/2016 | Hoglund | H04W 52/0216 370/311 |
| 2016/0192433 A1* | 6/2016 | Deenoo | H04W 72/046 370/329 |
| 2016/0360422 A1* | 12/2016 | Zhang | H04W 16/14 |
| 2017/0295576 A1* | 10/2017 | Fukuta | H04W 16/14 |
| 2017/0311206 A1* | 10/2017 | Ryoo | H04W 24/08 |
| 2017/0311344 A1* | 10/2017 | Lee | H04W 72/1289 |

OTHER PUBLICATIONS

Foreign Communication From a Related Counterpart Application, PCT Application No. PCT/KR2015/011896, International Search Report dated Mar. 31, 2016, 3 pages.
Foreign Communication From a Related Counterpart Application, PCT Application No. PCT/KR2015/011896, Written Opinion dated Mar. 31, 2016, 8 pages.

* cited by examiner

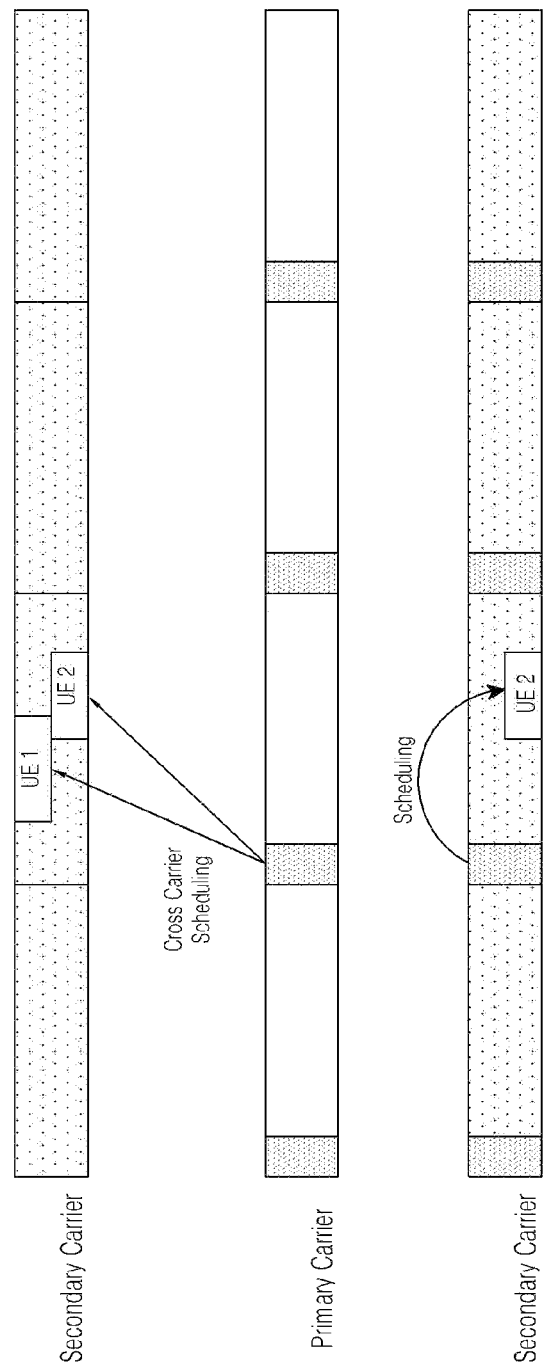
[Figure 1]

[Figure 2]
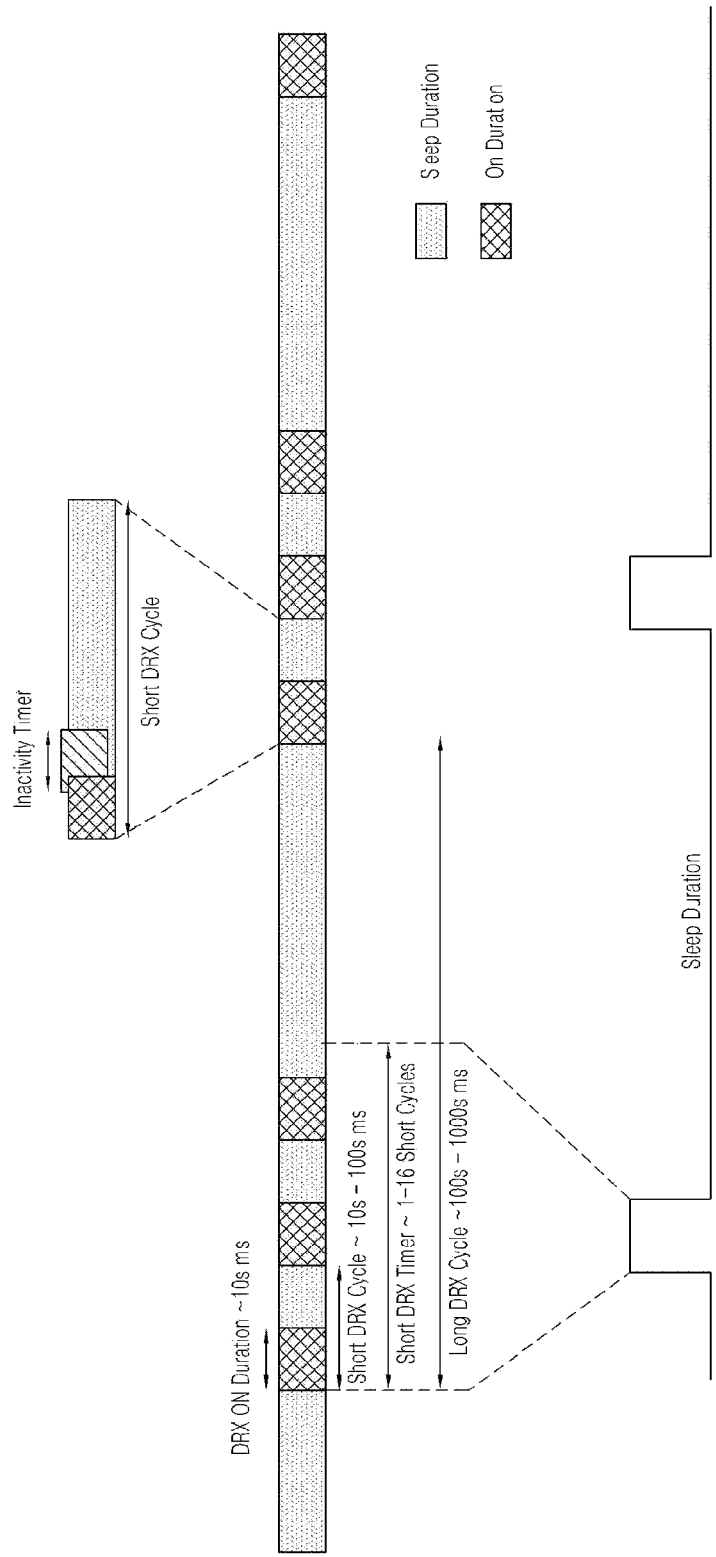

【Figure 3】
DRX Configuration for Primary CC
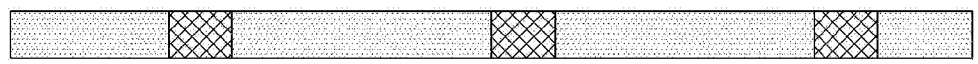
DRX Configuration for Secondary CC
Primary & Secondary CCs have a common DRX cycle & configuration
 DRX On Period

[Figure 4]
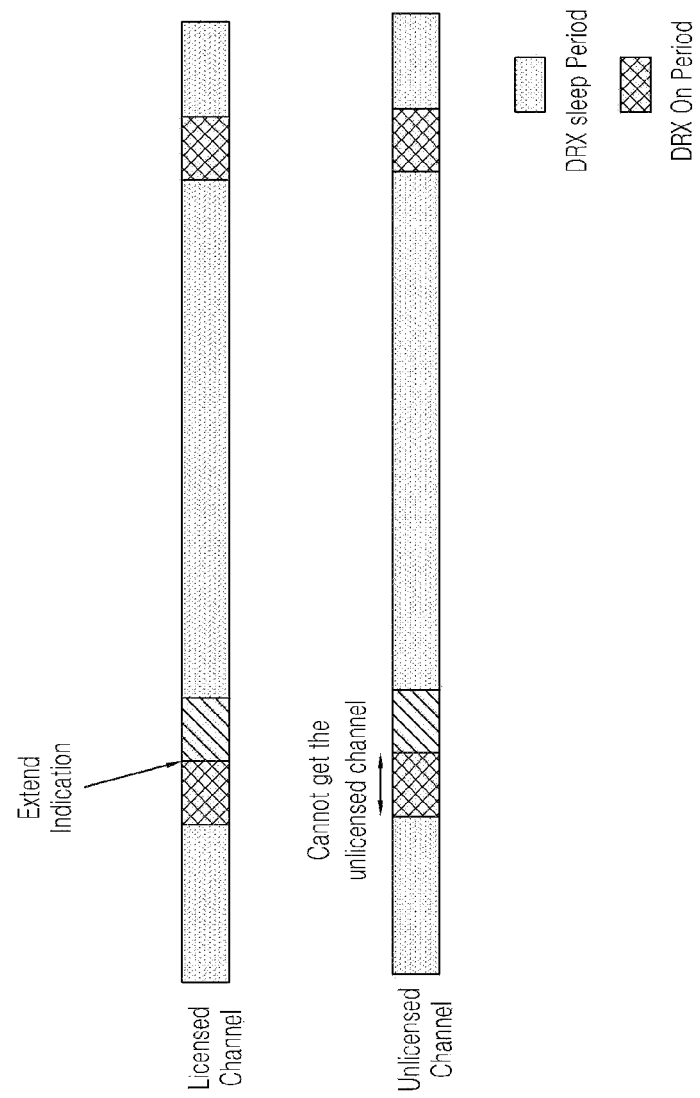

[Figure 5]
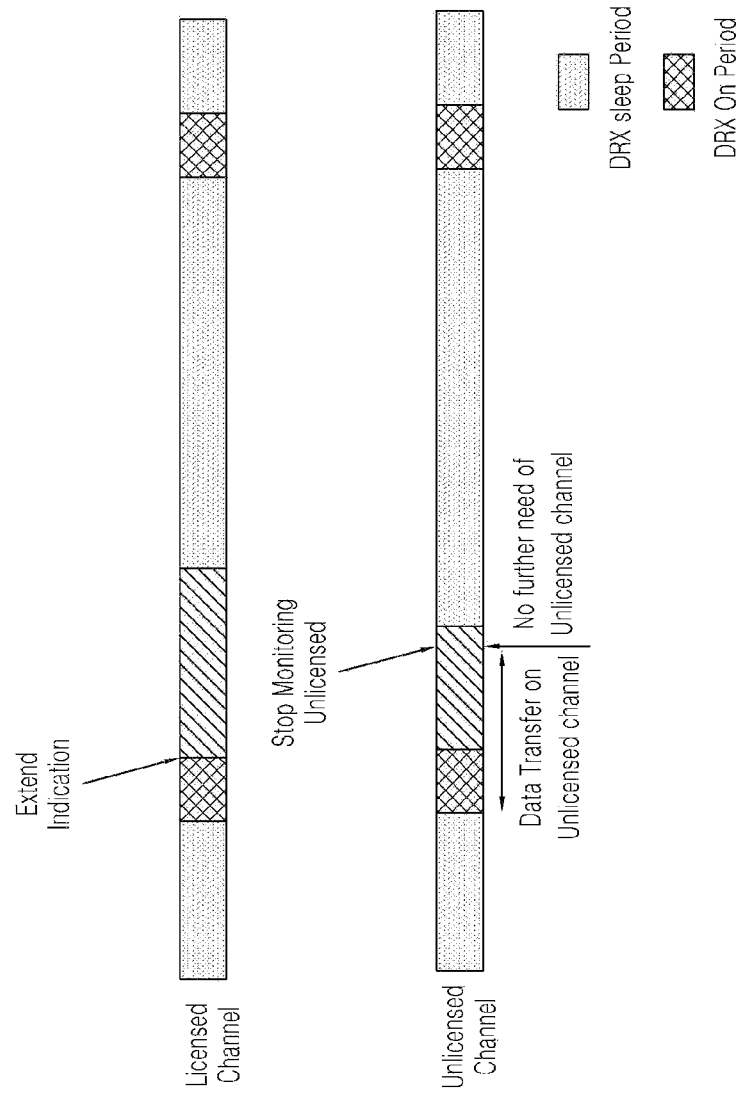

[Figure 6]
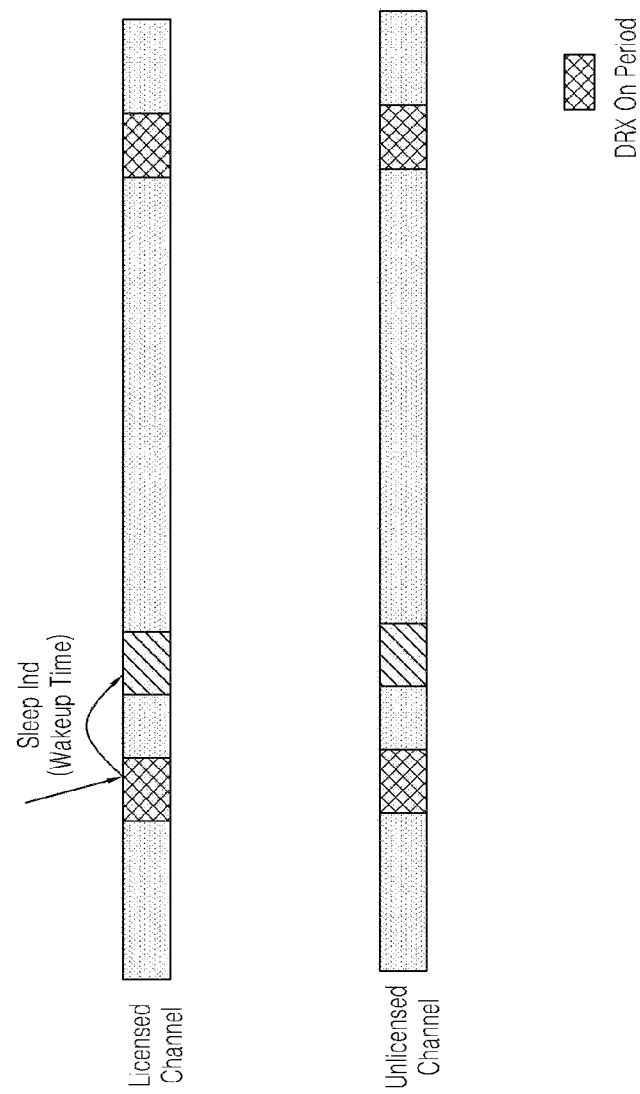

[Figure 7]
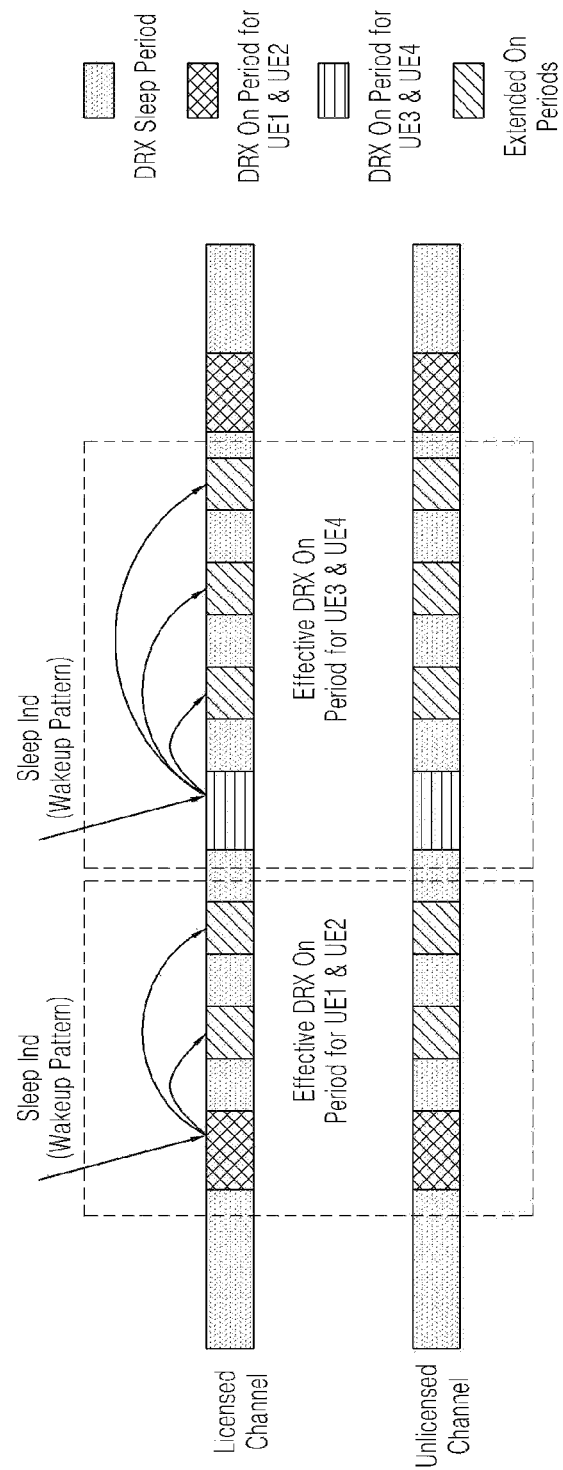

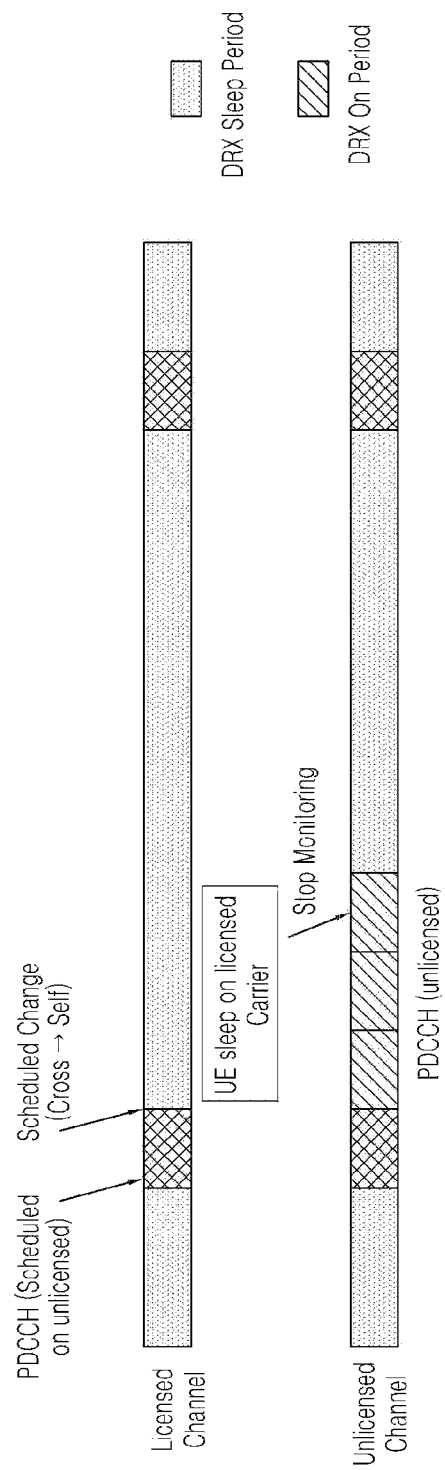
[Figure 8]

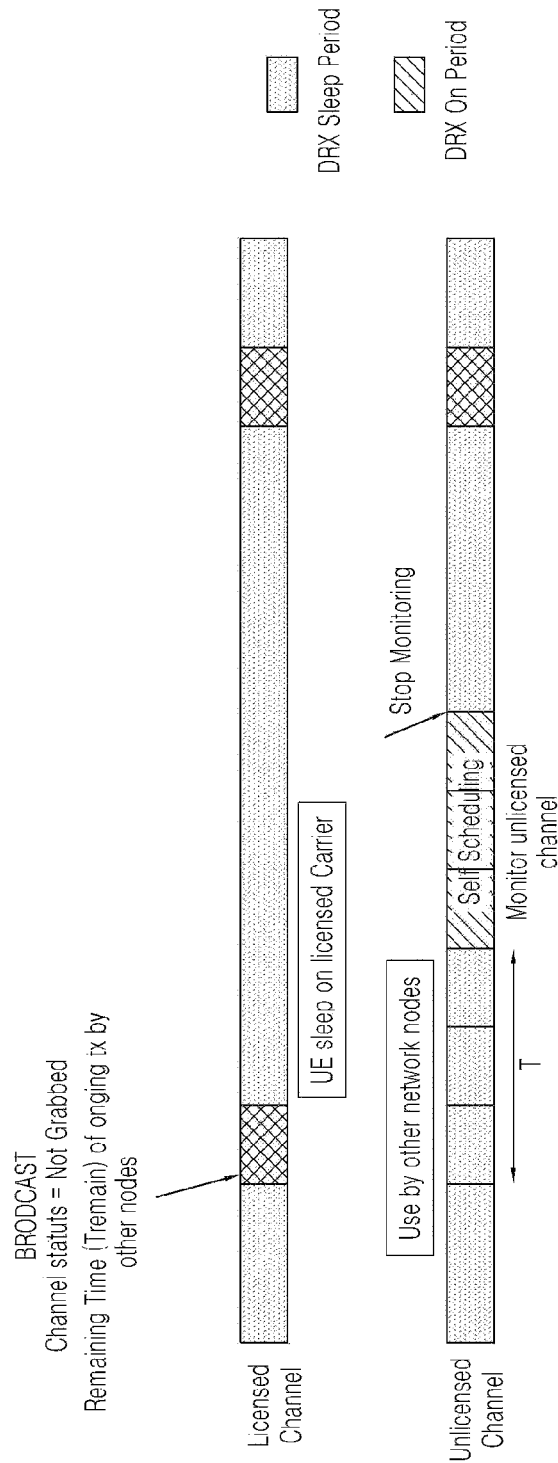
[Figure 9]

【Figure 10】
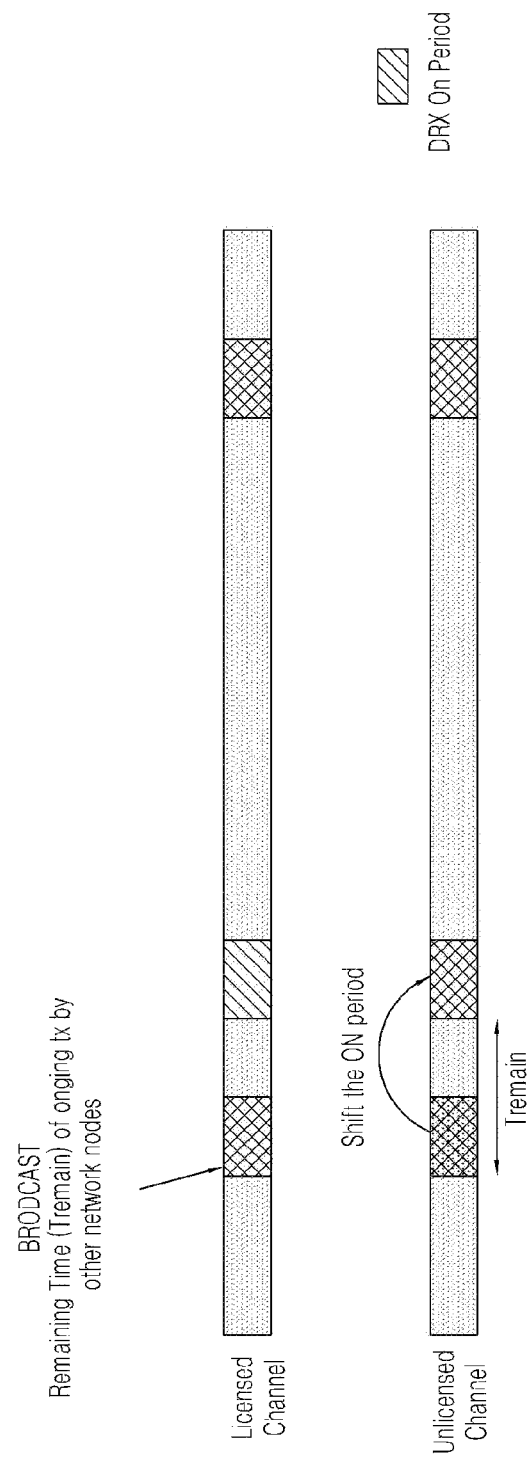

[Figure 11]
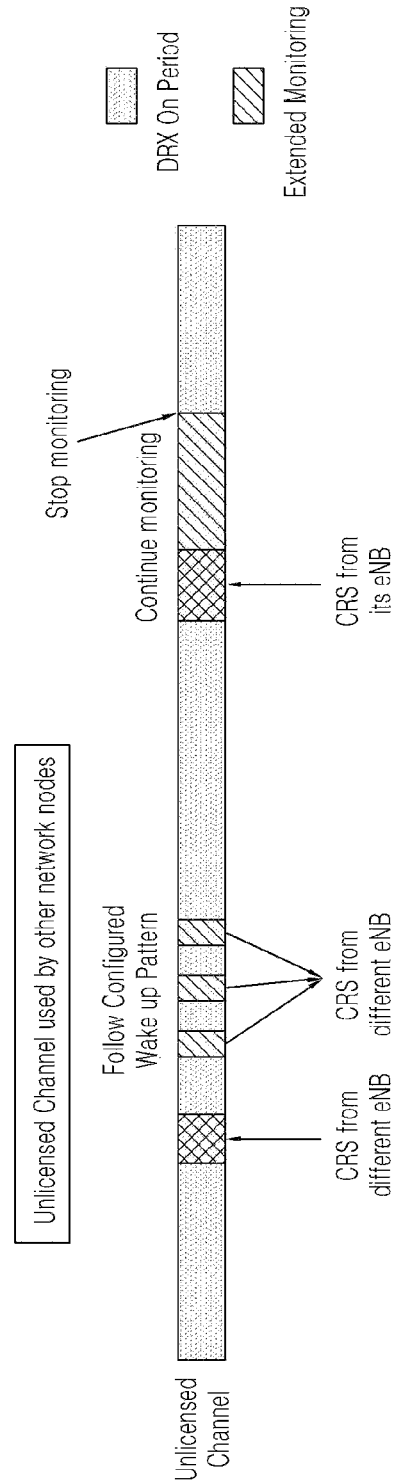

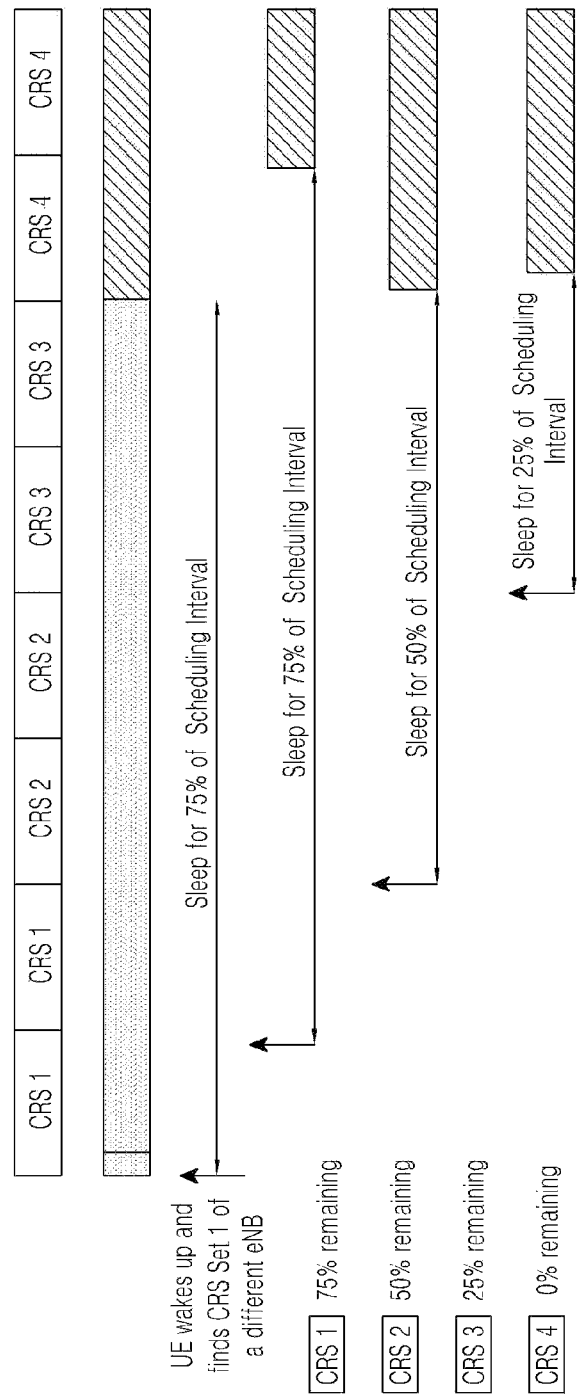
[Figure 12]

【Figure 13a】
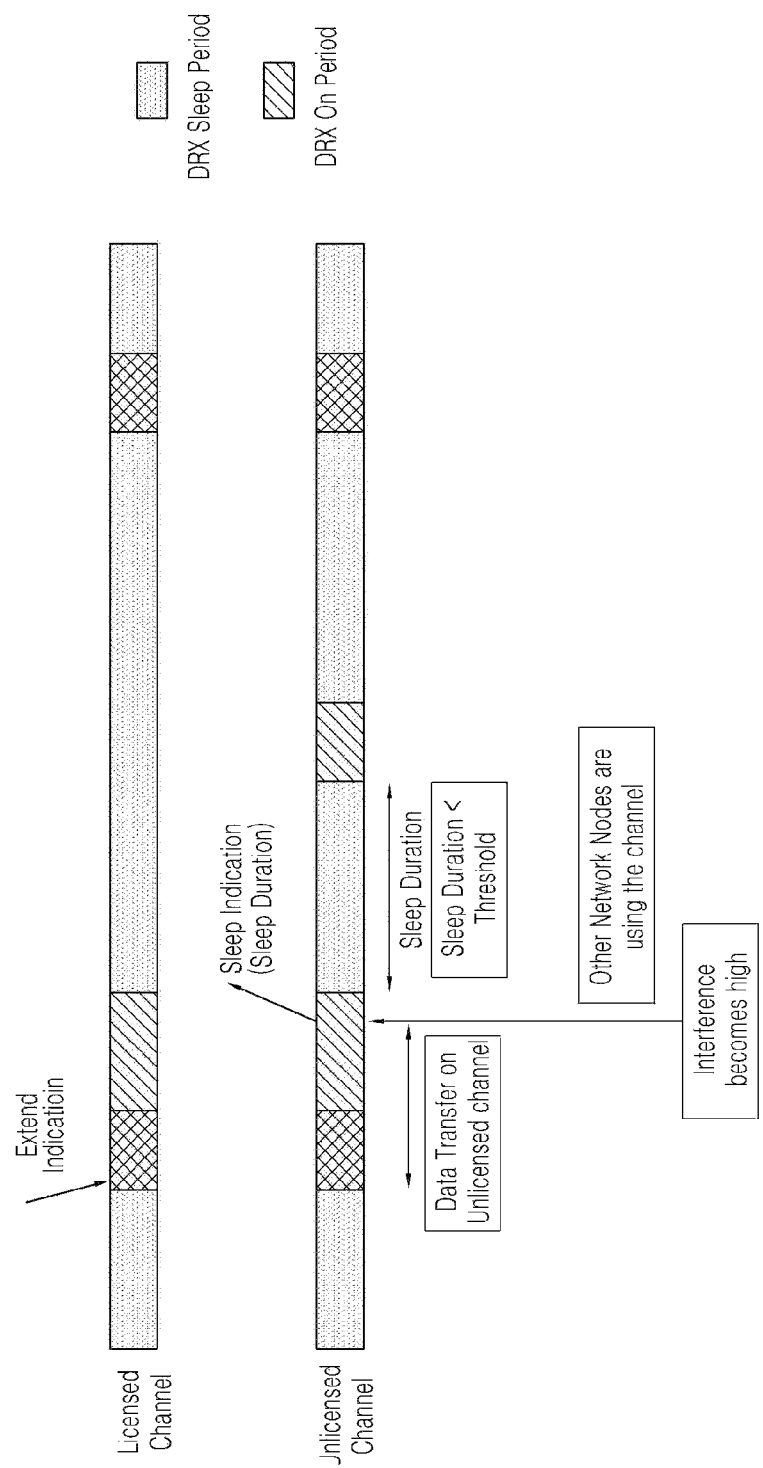

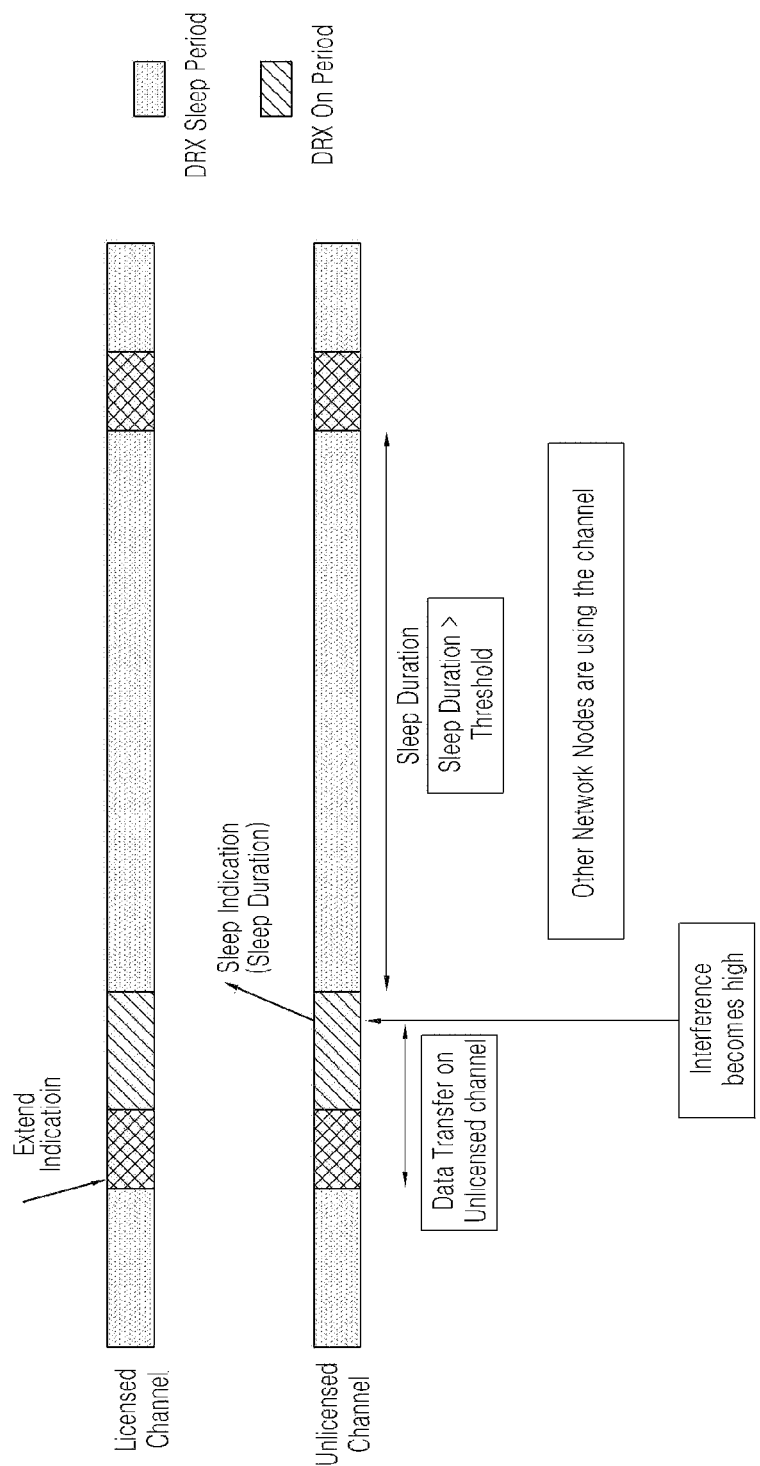
[Figure 13b]

METHOD AND SYSTEM FOR ENABLING DISCONTINUOUS RECEPTION (DRX) OVER AN UNLICENSED BAND IN CELLULAR NETWORKS

CROSS-REFERENCE TO RELATED APPLICATION(S) AND CLAIM OF PRIORITY

The present application claims priority under 35 U.S.C. § 365 to International Application No. PCT/KR2015/011896, which was filed on Nov. 6, 2015, and claims priority under U.S.C. § 119 Indian Patent Application No. 5594/CHE/2014, which was filed in the Indian Intellectual Property Office on Nov. 6, 2014, and Indian Patent Application No. 5594/CHE/2014, which was filed in the Indian Intellectual Property Office on Oct. 28, 2015, the entire content of each of which is incorporated by reference.

TECHNICAL FIELD

The present disclosure generally relates to cellular unlicensed band communications. The present disclosure more particularly relates to the licensed assisted operation of cellular communications in unlicensed spectrum

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

The cellular industry which was until now unassumingly built on the basic premise of operating over licensed spectrum is considering the usage of operation on unlicensed band in order to meet the surging traffic demands. The unlicensed bands are typically dominated by wireless fidelity (WiFi) and other technologies. A third generation partnership project (3GPP) has already decided to customize long term evolution (LTE) standards in the LTE Release 13 for operation on the unlicensed bands and to exist harmoniously with WiFi and other technologies. Unlicensed band is free to be used by any technology but is governed by few regulations (in most countries) like the requirement of "Listen Before Talk—LBT" which requires a transmitter to sense the channel for at least 20 us and if the channel is found to be free (not used by other devices) then it is allowed to transmit. Further the regulations allow for transmissions up to a maximum time limit and also provide means for giving fairness to the other devices/technologies.

In the legacy 3GPP LTE system, the concept of carrier aggregation (CA) is used in which multiple carriers can be allocated to a multi-carrier capable user equipment (UE) in order to boost the data rates. One carrier is referred to as the primary carrier and the other carriers are referred to as the secondary carriers. The subframe boundaries on all the carriers are considered to be aligned. The scheduling can be self-carrier based or cross carrier based. In the self-carrier mode, the physical data control channel (PDCCH) for a secondary carrier is sent on the secondary carrier itself while in cross carrier mode, the resource allocation for all the secondary carriers is contained in the PDCCH that is sent on the primary carrier only. This is further illustrated in FIG. 1.

In 3GPP LTE Release 8 system, the discontinuous reception (DRX) operation is defined by a long DRX cycle, an on duration timer, DRX Inactivity timer, DRX retransmission timer and a DRX short cycle. A UE is configured with these DRX parameters in order to perform power savings. The UE wakes up periodically to check if it has data and may switch to low power state when it has no data and wake up again at the next on period. This cycle of on and off periods is called as the DRX cycle. Further since the data traffic is primarily composed of internet type of data which has a characteristic that if some data has come, probably more data will come soon, the DRX mechanism is designed to utilize this characteristic by employing a DRX inactivity timer which is reset when a data packet is received. If no data packet is received during the inactivity timer duration then the UE goes in off state. Further in order to avoid long latency in receiving data, the DRX mechanism employs a short DRX cycle which is similar in behavior to normal (or long) DRX cycle but has a shorter off period. This is further illustrated in FIG. 2.

In the 3GPP LTE Release 10 system, CA was introduced for the purpose of increasing bandwidth (and hence throughput) for a user. In CA, multiple component carriers (CC) can be assigned to one UE in order to boost the data throughput. The carriers can be in the same band or in different bands. Even when the carriers are in the same band, they can be either adjacent to each other or not. The DRX operation in CA, is defined to be common across all the carriers which implies that the ON and the off periods are same and aligned across all the carriers. The reason for this approach was:
  Simple operation
    UE needs to maintain only one set of DRX parameters
  UE needs to monitor all CCs during on duration)
    PDCCH on primary can indicate the resource allocation for secondary (cross carrier scheduling)
  Primarily intra band CA is targeted by Rel 10
    One receiver can receive both CCs)
    Aligning is beneficial
  Unnecessarily monitoring (if no data on secondary) of secondary CCs may not be too much
    As the Primary eNB should activate CCs only when UE needs more data
The primary motivation was that since the carriers typically will be in the same band, so a single receiver was enough to capture all the carriers and hence aligning the DRX was beneficial because the receiver will anyways capture all the carriers when it is switched on to capture one CC. This is illustrated in FIG. 3.

3GPP has started to work on utilizing the unlicensed bands for cellular communication. It has been agreed to add an unlicensed carrier in the legacy carrier aggregation framework of LTE. The unlicensed carrier is assumed to work in a license assisted manner. The standalone usage of unlicensed carrier is not conceived for the initial phases. This system is further referred to as LTE in unlicensed spectrum (LTE-U).

In LTE-U system since the usage of the unlicensed channel is not deterministic in time, the DRX operation on the unlicensed channel cannot follow a deterministic pattern. In the legacy LTE DRX, the on periods (the wake up periods) are synchronized between the primary and the secondary carriers. However, in the LTE-U licensed assisted access (LAA) operation, if the same mechanism is used then due to the very nature of the unlicensed channel, there is no guarantee that the unlicensed channel is available during the on period of the primary carrier. Hence mechanisms are required to define operation of DRX on the unlicensed band which can lead to effective power savings for the UE. If no DRX is followed then it will lead to high power consumption as the UE will have to continuously monitor the unlicensed channel.

The above information is presented as background information only to assist with an understanding of the present disclosure. No determination has been made, and no assertion is made, as to whether any of the above might be applicable as prior art with regard to the present disclosure.

Thus there is need for mechanisms to define operation of DRX on the unlicensed band which can lead to effective power savings for the UE. If no DRX is followed then it will lead to high power consumption as the UE will have to continuously monitor the unlicensed channel.

SUMMARY

Various embodiments herein describe a method for enabling discontinuous reception (DRX) over an unlicensed band in cellular networks. According to one embodiment, the method comprises of monitoring, by a user equipment (UE), an unlicensed channel at a pre-configured on period of a DRX cycle, wherein the UE wakes up during a DRX on period and sleeps during a DRX off period, receiving, by the UE, an indication for extension of the DRX on period of the unlicensed channel from a base station when the base station is unable to acquire the unlicensed channel during a DRX on period of the licensed channel, and monitoring, by the UE, the unlicensed band for an extended DRX on period in response to the indication for extension of the DRX on period.

According to one embodiment, the indication comprises a time period of the extended DRX on period.

According to one embodiment, the time period of the extended DRX on period is selected from a set of pre-specified extension values.

According to one embodiment, the method further comprises of receiving, by the UE, a stop monitoring indication from the base station for terminating the monitoring of the DRX on period of the unlicensed channel, and terminating, by the UE, the monitoring of the unlicensed channel until the start of subsequent DRX on period in response to the receipt of stop monitoring indication.

According to one embodiment, the method further comprises of receiving, by the UE, a wakeup time on the unlicensed channel for enabling the UE to wake up and monitor the unlicensed channel, wherein the wakeup time is an offset received from a physical data control channel (PDCCH) to initiate data transmission on the unlicensed channel.

According to one embodiment, the method further comprises of receiving, by the UE, a subsequent wakeup indication from the base station to indicate subsequent wakeup time period for the UE to monitor the unlicensed channel, and terminating, by the UE, monitoring of the unlicensed channel after receiving the subsequent wakeup indication for the time period provided in the subsequent wakeup indication, after which the UE wakes up for monitoring the unlicensed channel.

According to one embodiment, the method further comprises of receiving, by the UE, a wakeup indication pattern comprising a set of wakeup times from the base station for intiating the UE to wake up for monitoring the unlicensed channel.

According to another embodiment, the present disclosure provides a method for enabling discontinuous reception (DRX) over unlicensed band in cellular operations, the method comprising: monitoring, by a user equipment (UE), a licensed channel and an unlicensed channel during a DRX on period, receiving, by the UE, a scheduling type change indication on the licensed channel from an base station to indicate the change of scheduling from a cross carrier scheduling mode to a self-scheduling mode until a next DRX on period, changing, by the UE, the scheduling type to the self-scheduling mode on receiving the scheduling type change indication, wherein the scheduling type change indication comprises information of at least one of a start time of the self-scheduling mode, a duration for monitoring the unlicensed channel, and a wakeup pattern of the UE, and monitoring, by the UE, the unlicensed channel based on at least one of the start time of the self-scheduling mode, the duration for monitoring the unlicensed channel and the wakeup pattern of the UE provided in the scheduling type change indication.

According to one embodiment, the method further comprises of allowing, by the base station, the UE to sleep on the licensed channel when the cross-carrier scheduling mode is changed to self-scheduling mode.

According to another embodiment, the present disclosure provides a method of enabling discontinuous reception (DRX) in cellular operations over unlicensed band. The method comprises of checking, by an evolved node B (eNB) associated with a user equipment (UE), whether a transmission is ongoing on an unlicensed channel by one or more neighboring network nodes, broadcasting by the base station, a remaining time duration of the ongoing transmission on a licensed channel to the UE when the transmission is ongoing on the unlicensed channel, receiving by the UE, the remaining time duration of the ongoing transmission by the one or more neighboring network nodes; and monitoring by the UE, the unlicensed channel upon completion of the ongoing transmission by the one or more neighboring network nodes.

According to one embodiment, the method further comprises of broadcasting channel status of the unlicensed channel to the UE on the licensed channel, when the transmission is ongoing on the unlicensed channel, receiving, by the UE, the channel status of the unlicensed channel, and applying a pre-specified wakeup pattern for monitoring the unlicensed channel.

According to one embodiment, the method further comprises of shifting, by the UE, a DRX on period of the unlicensed channel by the remaining time duration.

According to one embodiment, the one or more neighboring network nodes comprises at least one of a Wi-Fi node and one or more eNBs other than the base station According to another embodiment, the present disclosure provides a method for enabling discontinuous reception (DRX) over unlicensed band in cellular operations. The method comprises of monitoring, by an user equipment (UE), an unlicensed channel during a DRX on period, wherein the unlicensed channel is configured with a DRX cycle independent from a DRX cycle of a licensed channel, detecting, by the UE, a cell-specific reference signal (CRS) indicating an ongoing transmission while monitoring the unlicensed channel, determining, by the UE, whether the detected CRS belong to an evolved Node B (eNB) associated with the UE, continuing to monitor, by the UE, the unlicensed channel when the detected CRS belongs to the eNB associated with the UE, and terminating, by the UE, the monitoring of the unlicensed channel if the detected CRS does not belong to the eNB associated with the UE.

According to one embodiment, the method further comprises of assigning a set of CRS to the eNB to detect a quantized remaining time of the ongoing transmission, detecting at least one CRS from the set of CRS assigned to the base station during the ongoing transmission, and calculating the quantized remaining time of the ongoing transmission based on the detected at least one CRS, and terminating the monitoring of the unlicensed channel for the calculated quantized remaining time of the ongoing transmission.

According to one embodiment, the value of CRS is represented as at least one of a code, a resource, time, and a combination of code, resource and time.

According to another embodiment, the present disclosure provides a method for enabling discontinuous reception (DRX) over an unlicensed band in cellular networks. The method comprises of determining, by a user equipment (UE), an ongoing transmission in the unlicensed channel by at least one or more neighboring network nodes during a DRX on period, sending, by the UE, a sleep indication along with a sleep duration to an associated evolved node B (eNB) on the licensed channel, when the transmission is ongoing on the unlicensed channel by one or more neighboring network nodes, and terminating monitoring of the unlicensed channel until the completion of sleep duration provided in the sleep indication.

According to one embodiment, the method further comprises of determining whether the sleep duration provided in the sleep indication is less than a pre-configured threshold value, and monitoring the unlicensed channel at end of the indicated sleep duration if the sleep duration is less than the pre-configured threshold value.

Embodiments herein further disclose a system for enabling discontinuous reception (DRX) over an unlicensed band in cellular network. The system comprises of a user equipment (UE) wirelessly connected to at least one evolved node B (eNB), where the UE is adapted for: monitoring an unlicensed channel at a pre-configured on period of a DRX cycle, wherein the UE wakes up during a DRX on period and sleeps during a DRX off period, receiving an indication for extension of the DRX on period of the unlicensed channel from an associated evolved node B (eNB) when the associated eNB is unable to acquire the unlicensed channel during a DRX on period of the licensed channel, and continuously monitoring the unlicensed band for an extended DRX on period in response to the indication for extension of the DRX on period.

The foregoing has outlined, in general, the various aspects of the disclosure and is to serve as an aid to better understanding the more complete detailed description which is to follow. In reference to such, there is to be a clear understanding that the present disclosure is not limited to the method or application of use described and illustrated herein. It is intended that any other advantages and objects of the present disclosure that become apparent or obvious from the detailed description or illustrations contained herein are within the scope of the present disclosure.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1 is a schematic diagram illustrating an exemplary scheduling of resources for multi-carrier capable user equipment (UE) based on cross-carrier scheduling mode and self-carrier scheduling mode, according to the prior art.

FIG. 2 is a schematic diagram illustrating an exemplary discontinuous reception (DRX) mechanism employing a short DRX cycle with a shorter off period, according to the prior art.

FIG. 3 is a schematic diagram illustrating an exemplary carrier aggregation in which a DRX cycle for all component carriers are having same on and off periods and are aligned across all carriers, according to the prior art.

FIG. 4 is a schematic diagram illustrating an exemplary DRX cycle having an extended DRX on period of an unlicensed channel, according to one embodiment.

FIG. 5 is a schematic diagram illustrating an exemplary reception of a stop monitoring indication for a UE to terminate monitoring of a DRX on period of an unlicensed channel, according to one embodiment.

FIG. 6 is a schematic diagram illustrating an exemplary reception of subsequent wakeup indication for allowing a UE to monitor an unlicensed channel, according to one embodiment.

FIG. 7 is a schematic diagram illustrating an exemplary reception of a pattern of wakeup indications from an eNB for monitoring an unlicensed channel, according to one embodiment.

FIG. 8 is a schematic diagram illustrating an exemplary hybrid scheduling for an unlicensed channel, according to one embodiment.

FIG. 9 is a schematic diagram illustrating broadcasting of channel status with wakeup time for a UE to monitor an unlicensed channel, according to one embodiment.

FIG. 10 is a schematic diagram illustrating broadcasting of channel status with wakeup time for a UE to monitor an unlicensed channel, according to another embodiment.

FIG. 11 illustrates a DRX cycle in which DRX cycle for an unlicensed carrier is configured independently from a DRX cycle of a licensed carrier, according to one embodiment.

FIG. 12 illustrates a DRX cycle in which DRX cycle for an unlicensed carrier is configured independently from a DRX cycle of a licensed carrier, according to another embodiment.

FIGS. 13a and 13b are schematic diagrams illustrating exemplary ways of transmitting sleep indication along with duration by user equipment, after detecting that the channel is occupied by other network node, according to one embodiment.

Although specific features of the present disclosure are shown in some drawings and not in others. This is done for convenience only as each feature may be combined with any or all of the other features in accordance with the present disclosure.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

A method and apparatus proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a 3rd generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system and/or the like.

The present disclosure provides a method and system for enabling discontinuous reception (DRX) in cellular operation over unlicensed bands. In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following detailed description is, therefore, not to be taken in a limiting sense, and the scope of the present disclosure is defined only by the appended claims.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In all the embodiments below, the licensed and unlicensed carriers are assumed to be aligned at the subframe level unless stated otherwise. Further the start of the DRX on periods are assumed to be aligned among all the carriers unless stated otherwise.

Throughout the specification the terms "channel" and "carrier" are interchangeably used.

FIG. 4 is a schematic diagram illustrating an exemplary DRX cycle having an extended DRX on period of an unlicensed channel, according to one embodiment. According to this embodiment, the on duration of the DRX cycle on the unlicensed carrier is extended by sending an indication for extension on the licensed carrier wherein the start of the DRX on period on a licensed carrier and the unlicensed carriers are synchronized. Initially, user equipment (UE) starts to monitor the unlicensed carrier at a pre-configured on duration. If the unlicensed carrier was not occupied by an associated evolved node B (eNB) then the UE stays awake till the on duration of the licensed carrier and if it receives an indication of extension of the DRX on period of the unlicensed carrier, the UE continues to monitor the unlicensed carrier.

The extension indication is sent on the licensed carrier for further extension of the DRX on duration of the unlicensed carrier if the eNB was able to acquire the channel. The extension indication is used for example when the eNB was not able to occupy the unlicensed channel during the DRX on period of the licensed carrier. The extension enables the UE to remain awake for the specified time so that the eNB is able to attempt to acquire the unlicensed channel during the extension time period. The extension of DRX on period of the unlicensed channel is specially used when the eNB does not know the time duration of the channel occupancy for which the other network nodes have occupied the unlicensed channel. For example, the eNB is not aware of the NAV of the ongoing transmissions if the unlicensed channel is occupied by the WiFi nodes. The UE continues to monitor the licensed channel as well if the extension indication for unlicensed channel is received if the cross carrier scheduling is enabled for the unlicensed channel wherein the resource allocation information (physical data control channel (PDCCH)) for the unlicensed channel is sent on a licensed carrier for example, a primary carrier.

In one embodiment, the extension indication also includes the time period of extension. The UE monitors the unlicensed carrier till the time period of extension as indicated and then terminates monitoring of the unlicensed channel till the next DRX on period. In another embodiment, the extension period can be pre-specified. In another embodiment, a number of such extension indicators can be pre-specified or configured per UE or per unlicensed carrier for example by considering the dynamic interference or channel occupancy rate. The UE continues to monitor the licensed channel as well if the extension indication for unlicensed channel is received if the cross carrier scheduling is enabled for the unlicensed channel wherein the resource allocation information (PDCCH) for the unlicensed channel is sent on a licensed carrier for example a primary carrier. In one embodiment, the time period for extension of the DRX on period of the unlicensed carrier is chosen from a set of pre-specified extension values. If no extension indication is received by the UE, then the UE goes to sleep mode till the subsequent DRX on period.

FIG. 5 is a schematic diagram illustrating an exemplary reception of a stop monitoring indication for a UE to terminate monitoring of a DRX on period of an unlicensed channel, according to one embodiment. In this embodiment, the eNB sends a stop monitoring indication for terminating the monitoring of the DRX on period of the unlicensed channel. The UE on receiving the stop monitoring indication stops the monitoring of the unlicensed carrier until the start of the subsequent DRX on period. The stop monitoring indication can be sent during the configured on duration or during the extended on duration. The stop monitoring indication can be sent on the licensed carrier for example when cross carrier scheduling is used for the unlicensed channel or it can be sent on the unlicensed channel itself if the unlicensed channel is occupied by the eNB. This can be used for example when the eNB does not want to schedule the UE further or when it wants to end the extended monitoring duration.

In one embodiment, an exact wakeup time on the unlicensed carrier if cross carrier scheduling is used, is determined by an offset from the PDCCH to the start of the data on the unlicensed channel. The start of the monitoring of the unlicensed channel will be shifted by said offset. The said offset can be pre-specified or broadcasted or configured at a UE level or carrier level.

In another embodiment, the wake up time on the unlicensed carrier if cross carrier scheduling is used is aligned with the start of the PDCCH on the licensed carrier if there is no offset between the PDCCH and the start of the data on the unlicensed carrier.

In another embodiment, the wake up time on the unlicensed carrier is before the wake up time on the licensed carrier by an offset which is equal to the length of the scheduling interval which is spanned by PDCCH if the PDCCH can span both the preceding and following symbols of the unlicensed carrier such that the total length of the spanned symbols is equal to scheduling interval. For example, the unlicensed channel monitoring should start 1 ms before the scheduled wakeup boundary of the licensed carrier.

In another embodiment, the wake up time on the unlicensed carrier is aligned to the wake up time on the licensed carrier if self-scheduling is used on the unlicensed carrier.

FIG. 6 is a schematic diagram illustrating an exemplary reception of subsequent wakeup indication for allowing a UE to monitor an unlicensed channel, according to one embodiment. In this embodiment, a subsequent wakeup indication can be sent to the UE by the eNB to indicate the subsequent wakeup time for the unlicensed carrier prior to the next DRX on period wherein the subsequent wakeup indication includes the wakeup time after which the UE needs to wake up for monitoring of the unlicensed channel. The UE on receiving the subsequent wakeup indication sleeps (not monitor the unlicensed channel) till the time period indicated in the subsequent wakeup indication. The subsequent wake up indication can be sent on the licensed carrier for example when cross carrier scheduling is used for the unlicensed carrier or it can be sent on the unlicensed carrier itself if the unlicensed channel is occupied by the eNB. This is illustrated in FIG. 6. This can be used for example when the eNB knows the channel occupancy, time period of the ongoing transmissions by the other network nodes. For example, this can be used when the eNB knows the NAV of the ongoing transmissions if the channel is occupied by WiFi nodes.

In one embodiment, the subsequent wake up indication indicates the UE to wake up at the next DRX on period. For example, an appropriate value for the wakeup time can be set by the eNB. Alternatively, if the subsequent wakeup indication is sent without any wakeup time then the UE wakes up at the next DRX on period. In one embodiment, the maximum number of wakeup indications can be pre-specified or configured. The UE on receiving the maximum number of wake up indications can stop monitoring the unlicensed channel till the next DRX on period.

In one embodiment, the maximum wakeup duration can be pre-specified/configured beyond which the UE can stop the monitoring of the unlicensed carrier till the subsequent DRX on period.

FIG. 7 is a schematic diagram illustrating an exemplary reception of a pattern of wakeup indications from an eNB for monitoring an unlicensed channel, according to one embodiment. In this embodiment, a pattern of wake up indications can be given to the UE by the eNB wherein the pattern of the wake up time comprises of a set of wake up times. The wake up pattern can be configured to the UE by the eNB. The UE on receiving the wake up pattern monitors the unlicensed channel at the on duration of the configured DRX and then at the wake up durations as per the configured wakeup pattern until the stop indication is received or the wake up pattern ends following which the UE stops monitoring the unlicensed channel until the next DRX on period. For example consider that there are four UEs namely UE1, UE2, UE3, and UE4 present in the network and monitors the unlicensed channel during a DRX on period. The eNB provides a pattern of wake up indications for the UE to wake up at the wake up time to monitor the unlicensed channel. The eNB further provides extension of DRX on periods for the UEs if the eNB was not able to acquire the unlicensed channel at the pre-configured DRX on period. The same is illustrated in FIG. 7. In FIG. 7, the effective DRX on period for UE1 and UE2 are highlighted in red color and effective DRX on period for UE 3 and UE 4 are highlighted in orange color. Further, the extension of DRX on periods for all the UEs are highlighted in green color. The UE monitors the associated licensed carrier with the same wake up pattern as configured for unlicensed carrier if cross carrier scheduling is used for unlicensed carrier.

In one embodiment, the wake up pattern can be pre-specified. In another embodiment, the wake up pattern can be broadcasted. In another embodiment the wake up pattern can be configured per UE considering for example, the dynamic interference level and the channel occupancy rate. In yet another embodiment, the wakeup pattern can be configured per unlicensed carrier level. The eNB can design the wakeup pattern considering for example the channel occupancy period of the neighboring LTE-U nodes and the average or maximum channel occupancy period of the neighboring WiFi nodes. In one embodiment, the wake up pattern can be different for different groups.

In one embodiment, the UE follows the wake up pattern only if indicated by the eNB. For example, the extension indicator can indicate the enabling of the wake up pattern. In another embodiment, the UE does not follow the wake up pattern if it has received the stop indication.

In another embodiment, the UE follows the wakeup pattern if configured or pre-specified after the end of the on duration.

FIG. 8 is a schematic diagram illustrating an exemplary hybrid scheduling for an unlicensed channel, according to one embodiment. Of the two types of scheduling modes namely a cross carrier scheduling and self-carrier scheduling, consider that the unlicensed channel is scheduled with self-carrier scheduling wherein the scheduling information for the unlicensed channel is sent on the unlicensed channel itself. In this embodiment, the extension indication, stop monitoring indication, subsequent wake up indication can be sent on the unlicensed channel. The UE monitors the licensed channel only during the on duration of the licensed channel. The UE does not monitor the licensed channel during the extended on period of the unlicensed channel.

In one embodiment, a scheduling type change indication can be sent to the UE to indicate the change of scheduling type from cross carrier to self-scheduling. For example, the UE is configured with cross carrier scheduling for the unlicensed channel and hence the UE starts monitoring both the licensed and the unlicensed channel at the DRX on period. During the on period, a scheduling type change indication is sent on the licensed carrier to indicate the change of scheduling from cross carrier to self-scheduling.

The scheduling type change indication further includes start time of the new scheduling type. The scheduling change indication can also include the monitoring duration of the unlicensed carrier or the wake up pattern if the scheduling type is changed from cross carrier to self-scheduling. In another example, the scheduling type can be changed from self-scheduling to cross carrier scheduling by sending a scheduling type change indication on the unlicensed carrier. In another embodiment, the scheduling type change indication can be sent on a carrier which is different from the concerned unlicensed carrier and the associated licensed carrier. In such a case the details of the concerned unlicensed and the concerned licensed carrier can also be included in the scheduling type change indication. The concerned licensed carrier information can be skipped if the concerned licensed carrier is pre-specified or common for all unlicensed carriers. When the scheduling type is self-scheduling, the UE can follow the extension indicator or the wakeup pattern or the wakeup indication to continue the monitoring of the unlicensed channel if the unlicensed channel is not occupied. The scheduling change indication can be sent in PDCCH or as a medium access control (MAC) message or as a radio resource control (RRC) message.

FIG. 9 is a schematic diagram illustrating broadcasting of channel status with wakeup time for a UE to monitor an unlicensed channel, according to one embodiment. According to this embodiment, an eNB broadcasts the remaining time (or the subsequent wake up time) of the channel occupancy if the unlicensed channel is occupied by the other nodes. The eNB knows the remaining time of the ongoing transmissions for example if the eNB can decode the NAV of the ongoing transmission if the unlicensed channel is occupied by WiFi nodes. In another embodiment, the eNB can just indicate the channel status of the unlicensed channel wherein the channel status is 'grabbed' or 'not grabbed' depending on whether the eNB was able to grab the unlicensed channel or not. The same is illustrated in FIG. 9. This can be used for example when the eNB is not aware of the duration of the ongoing transmissions. The UE on decoding the remaining time can know when to start the monitoring of the unlicensed channel. In another embodiment, the UE on decoding the channel status can apply the wake up pattern (if configured) to monitor the unlicensed channel if the channel status is not grabbed. The remaining time and the channel status can be broadcasted on a licensed carrier for example the primary carrier.

FIG. 10 is a schematic diagram illustrating broadcasting of channel status with wakeup time for a UE to monitor an unlicensed channel, according to another embodiment. In this embodiment, the UE decodes the channel status and the remaining time at the DRX on period from the licensed carrier and then shift the DRX on period of the unlicensed carrier by the indicated remaining time. Further extension of the on period can follow the preceding embodiments. If the cross carrier scheduling is enabled for the unlicensed carrier then the licensed carrier also needs to be on during the shifted on duration of the unlicensed carrier.

FIG. 11 illustrates a DRX cycle in which DRX cycle for an unlicensed carrier is configured independently from a DRX cycle of a licensed carrier, according to one embodiment. As shown in FIG. 11, the DRX cycle for the unlicensed carrier is configured independently from the DRX cycle of the licensed carrier wherein the UE wakes up at a configured DRX on period on the unlicensed channel and detects a reference signal (RS/preamble/beacon) of an ongoing transmission. If the detected RS belongs to the associated eNB then the UE continues the monitoring of the unlicensed channel else the UE terminates the monitoring of the unlicensed channel and starts monitoring the unlicensed channel again as per the configured wake up pattern or wake up time. In one embodiment, the wakeup pattern is configured by the eNB at a UE or carrier level or is pre-specified or is broadcasted. The reference signal can be a cell specific reference signal (CRS) or alternatively, it can be synchronization signals (PSS/SSS) or some other legacy RS can be used for indicating the ongoing transmission. Alternatively, a new RS can be designed for indicating the ongoing transmission. The UE can stay awake for a pre-defined maximum duration after it detects that the channel is occupied by the associated eNB, wherein the maximum duration can be pre-specified or configured or broadcasted. Alternatively, a stop monitoring indication can be used to stop the monitoring of the unlicensed channel by the UE.

In another embodiment, an extension period is applied by the UE if the detected RS does not belongs to its associated eNB, wherein during the extension duration the UE keeps on monitoring the unlicensed channel. The extension duration can be configured at a UE level or carrier level or can be pre-specified or can be broadcasted. The UE continues to monitor the unlicensed channel until a stop monitoring indication is received or the wake up pattern ends or the extension duration ends and then the UE terminates the monitoring of the unlicensed channel until the next DRX on period.

FIG. 12 illustrates a DRX cycle in which DRX cycle for an unlicensed carrier is configured independently from a DRX cycle of a licensed carrier, according to another embodiment. In one embodiment, the DRX cycle for the unlicensed carrier is configured independently from the DRX cycle of the licensed carrier wherein the UE wakes up at the configured DRX on period on the unlicensed channel and detects the reference signal (RS/preamble/beacon) of the ongoing transmission wherein a set of Reference Signals are used to detect the quantized remaining time of the ongoing transmission based on which the UE can stop the monitoring of the unlicensed channel for a calculated time duration. In one embodiment, a set of CRS are assigned to one eNB wherein the eNB uses a subset 1 of the CRS set for the 1st part of the channel occupancy period and a subset 2 of the CRS set for the 2nd part of the channel occupancy period and so on. Based on the CRS that the UE detects, the UE can sleep for until the start of the last portion of the channel occupancy period. For example, if each eNB is assigned 4 CRS then set of CRS is comprised of 4 CRS. The channel occupancy time of 8 ms, for example, is divided into the number of portions equal to the number of CRSs in the CRS set which implies each portion is 2 ms in this example. The eNB uses CRS 1 in the first 2 ms, the CRS 2 in the next 2 ms, CRS 3 in the next 2 ms and the CRS 4 in the last 2 ms of the channel occupancy period. If the UE detects CRS 1 then it can sleep for 75% (6 ms) of the channel occupancy period. If the UE detects CRS 2 then it can sleep for 50% (4 ms) of the channel occupancy period. If the UE detects CRS 3 then it can sleep for 25% (2 ms) of the channel occupancy period. If the UE detects CRS 4 then it should continue to remain awake.

In another embodiment, the CRSs in the set can be distinguished in code or time or frequency or a combination of these. For example, only one CRS in code is assigned to one eNB but the eNB can differentiate the different portions of the channel occupancy period using different time symbols in which the CRS is transmitted. For example, in the 1st portion of the channel occupancy period the CRS are spaced n1 symbols apart, in the 2nd portion of the channel occupancy period, the CRS are spaced n2 symbols apart, in the 3rd portion of the channel occupancy period the CRS are spaced n3 symbols apart and in the 4th portion of the channel occupancy period the CRS are spaced n4 symbols apart. Similarly the CRS can be placed in different frequency resources (subcarriers) in different channel occupancy periods. Alternatively instead of CRS, the same embodiments can be applied on any RS or synchronization signals.

FIGS. 13a and 13b are schematic diagrams illustrating exemplary ways of transmitting sleep indication along with duration by user equipment, after detecting that the channel is occupied by other network nodes, according to one embodiment. The UE upon detecting that the channel is occupied by other network nodes during the configured DRX on duration, reports to the eNB by sending a sleep indication which can include the sleep duration if the UE is aware of the duration of the ongoing transmissions for example if the UE is aware of the NAV of the ongoing WiFi transmission. The sleep indication can be sent on the licensed carrier for example the primary carrier. The UE does not need to monitor the unlicensed carrier till the sleep duration and can monitor the unlicensed carrier at the end of the indicated sleep duration if the sleep duration is less than a pre-configured threshold else it can monitor the unlicensed carrier at the next DRX on period. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for enabling discontinuous reception (DRX) over an unlicensed band by a user equipment (UE), the method comprising:
monitoring an unlicensed channel during a pre-configured DRX on period of a DRX cycle that comprises the pre-configured DRX on period and a pre-configured DRX off period, wherein the UE wakes up during the pre-configured DRX on period and sleeps during the pre-configured DRX off period;
receiving an indication for extension of the pre-configured DRX on period through a licensed channel from a base station, wherein the indication for the extension is transmitted from the base station based on the base station being unable to acquire the unlicensed channel during the pre-configured DRX on period and being unaware of a channel occupancy of the unlicensed channel;
monitoring the unlicensed channel during an extended DRX on period in response to receiving the indication for extension of the pre-configured DRX on period;
receiving an indication for shifting of the pre-configured DRX on period through the licensed channel from a base station, wherein the indication for the shifting includes information about a remaining time duration of the channel occupancy of the unlicensed channel, and the indication for the shifting is transmitted from the base station based on the base station being unable to acquire the unlicensed channel during the pre-configured DRX on period and being aware of the channel occupancy of the unlicensed channel; and
shifting the pre-configured DRX on period by the remaining time duration and monitoring the unlicensed channel during a shifted DRX on period in response to receiving the indication for shifting of the pre-configured DRX on period,
wherein the indication for the extension comprises a time period of the extension, the time period being determined based on information associated with channel status, and
wherein a start of the pre-configured DRX on period of the unlicensed channel is synchronized with a start of a pre-configured DRX on period of the licensed channel.

2. The method of claim 1, wherein the time period of the extension is selected from a set of pre-specified extension values.

3. The method of claim 1, further comprising:
receiving a stop monitoring indication from the base station for terminating the monitoring of the pre-configured DRX on period; and
terminating the monitoring of the unlicensed channel until start of a subsequent DRX on period in response to receiving the stop monitoring indication.

4. The method of claim 1, further comprising:
receiving wakeup time on the unlicensed channel for enabling the UE to wake up and monitor the unlicensed channel,
wherein the wakeup time is an offset from a physical data control channel (PDCCH) to initiate data transmission on the unlicensed channel.

5. The method of claim 4, further comprising:
receiving a subsequent wakeup indication from the base station to indicate a subsequent wakeup time period for the UE to monitor the unlicensed channel; and
terminating monitoring of the unlicensed channel after receiving the subsequent wakeup indication for the time period provided in the subsequent wakeup indication, after which the UE wakes up for monitoring the unlicensed channel.

6. The method of claim 5, further comprising:
receiving a pattern of wakeup indication comprising a set of wakeup times from the base station for initiating the UE to wake up for monitoring the unlicensed channel.

7. A user equipment (UE), comprising:
a transceiver; and
at least one processor configured to:
monitor an unlicensed channel during a pre-configured DRX on period of a discontinuous reception (DRX) cycle that comprises the pre-configured DRX on period and a pre-configured DRX off period, wherein the UE wakes up during the pre-configured DRX on period and sleeps during the pre-configured DRX off period;
control the transceiver to receive an indication for extension of the pre-configured DRX on period through a licensed channel from a base station, wherein the indication for the extension is transmitted from the base station based on the base station being unable to acquire the unlicensed channel during the pre-configured DRX on period and being unaware of a channel occupancy of the unlicensed channel; and monitor the unlicensed channel during an extended DRX on period in response to receiving the indication for extension of the pre-configured DRX on period;

control the transceiver to receive an indication for shifting of the pre-configured DRX on period through the licensed channel from a base station, wherein the indication for the shifting includes information about a remaining time duration of the channel occupancy of the unlicensed channel, and the indication for the shifting is transmitted from the base station based on the base station being unable to acquire the unlicensed channel during the pre-configured DRX on period and being aware of the channel occupancy of the unlicensed channel; and shift the pre-configured DRX on period by the remaining time duration and monitor the unlicensed channel during a shifted DRX on period in response to receiving the indication for the shifting of the pre-configured DRX on period, wherein the indication for the extension comprises a time period of the extension, the time period being determined based on information associated with channel status, and wherein a start of the pre-configured DRX on period of the unlicensed channel is synchronized with a start of a pre-configured DRX on period of the licensed channel.

8. The UE of claim 7, wherein the time period of the extension is selected from a set of pre-specified extension values.

9. The UE of claim 7, wherein the at least one processor further configured to:

control the transceiver to receive a stop monitoring indication from the base station for terminating the monitoring of the pre-configured DRX on period; and terminate the monitoring of the unlicensed channel until start of a subsequent DRX on period in response to receiving the stop monitoring indication.

10. The UE of claim 7, wherein the at least one processor further configured to:

control the transceiver to receive a wakeup time on the unlicensed channel for enabling the UE to wake up and monitor the unlicensed channel, wherein the wakeup time is an offset from a physical data control channel (PDCCH) to initiate data transmission on the unlicensed channel.

11. The UE of claim 10, wherein the at least one processor further configured to:

control the transceiver to receive a subsequent wakeup indication from the base station to indicate subsequent wakeup time period for the UE to monitor the unlicensed channel; and terminate monitoring of the unlicensed channel after receiving the subsequent wakeup indication for the time period provided in the subsequent wakeup indication, after which the UE wakes up for monitoring the unlicensed channel.

12. The UE of claim 11, wherein the at least one processor further configured to:

control the transceiver to receive a pattern of wakeup indication comprising a set of wakeup times from the base station for initiating the UE to wake up for monitoring the unlicensed channel.

\* \* \* \* \*